Dec. 15, 1925.
W. J. GROTENHUIS
AUTOMOBILE BUMPER
Filed Aug. 14, 1924
1,565,272
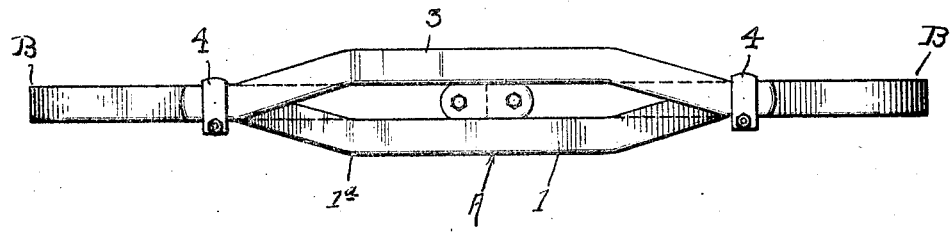
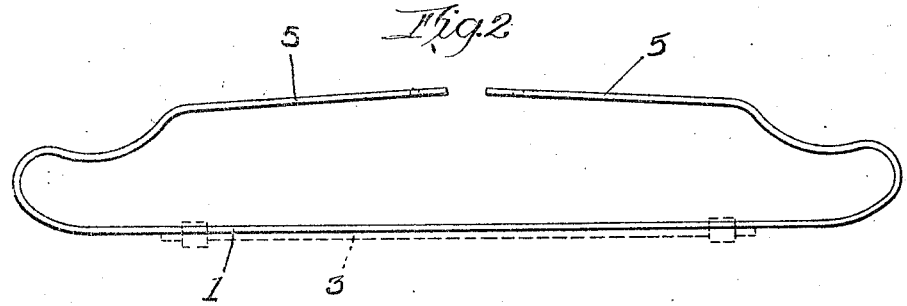
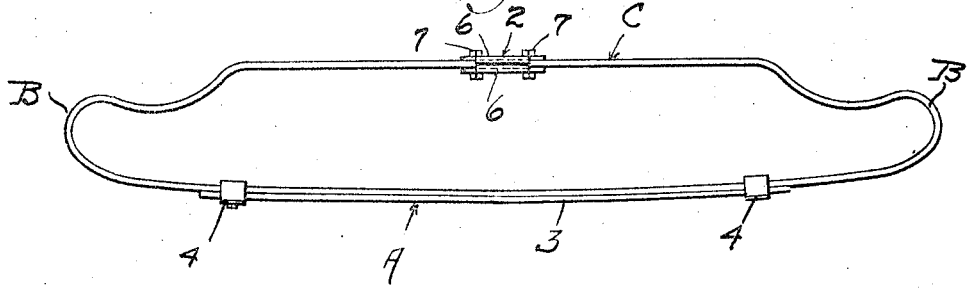
Inventor,
William J. Grotenhuis Patented Dec. 15, 1925.

1,565,272

UNITED STATES PATENT OFFICE.

WILLIAM J. GROTENHUIS, OF CHICAGO, ILLINOIS, ASSIGNOR TO BIFLEX PRODUCTS COMPANY, OF WAUKEGAN, ILLINOIS, A CORPORATION OF DELAWARE.

AUTOMOBILE BUMPER.

Application filed August 14, 1924. Serial No. 731,935.

*To all whom it may concern:*

Be it known that I, WILLIAM J. GROTENHUIS, a citizen of the United States of America, and a resident of Chicago, in the county of Cook and State of Illinois, have invented a certain new and useful Improvement in Automobile Bumpers, of which the following is a specification.

This invention relates to improvements in automobile bumpers and more particularly to a type of bumper which includes a continuous bar of spring steel extending throughout the length of the forward or impact portion thereof and having its end portions bent rearwardly and inwardly in U-shape with its extremities brought together centrally and rearwardly of the impact portion and secured together. In the present disclosure, the bumper has an increased impact area intermediate the ends of the forward or impact portion, the continuous bar being offset vertically and a shorter auxiliary bar, shaped to conform with the offset portion of the continuous bar, secured at its ends to the latter, thus forming vertically spaced portions substantially greater in width than the remaining portions of the bumper.

Structurally this type of bumper resembles a flattened resilient loop of spring steel capable of resisting impact by reason of its ability to absorb the shock and to distribute the same uniformly throughout the structure.

The object of the present invention is to introduce added rigidity into the bumper by placing the structure under an initial tension thereby affording added capacity to resist the shock of impact, as well as to eliminate any tendency for vibration in the structure itself, which is ordinarily set up by the movement of the vehicle over uneven or rough pavements.

The method by which the bumpers are treated in order to secure the advantages herein set forth and the manner in which the complete structure differs from ordinary bumpers of this type, is clearly illustrated in the accompanying drawings, in which—

Fig. 1 is a view in front elevation of a type of bumper especially suited to be treated in accordance with the invention.

Fig. 2 is a top plan view of the main bar of the bumper showing the form in which it is bent or shaped prior to the final assembling, and Fig. 3 is a top plan view of the complete bumper showing the final contour of the structure.

Figs 1 and 3 illustrate a bumper embodying the features of design hereinbefore described, the essential parts thereof being the impact section or member A, the looped or U-shaped end portions B and the rearwardly disposed portion C extending between the end portions and substantially parallel with the impact member A. A single continuous bar 1 forms the main element of the bumper, the same extending throughout the impact member A, bent rearwardly and inwardly and U-shaped at its ends to form the end portions B—B and its extremities brought together in abutting engagement rearwardly of the center of the impact member A and secured by a clamping member 2 hereinafter to be described.

The portion of the bar 1 extending throughout the central portion of the impact member A is offset vertically in a downward direction as at 1$^a$, the amount of offset being substantially equal to the width or vertical dimension of the bar. A short auxiliary bar 3 of the same dimensions is bent or shaped to conform exactly to the offset portion 1$^a$ of the bar 1, and secured by means of clamps 4—4 to the main bar 1 with its end portions in overlapping and flatwise contact with the front face of said main bar.

Fig. 2 shows the main bar shaped in its initial form and prior to the application of the auxiliary bar 3 or the connecting member 2 which secures its free ends together and completes the looped structure. It is to be noted that the forward portion of the bar included between the U-shaped ends is straight and that the rearwardly disposed extremities 5—5, which together form the rear bar C, diverge rearwardly as they approach each other and that their ends are spaced apart with a considerable gap between. This diversion of the rear end portions 5—5 places them out of alinement with each other and out of parallel with the straight front portion of the bar.

To the main bar 1 in the form just described and as disclosed in Fig. 2, the auxiliary bar 3 is next clamped in place, the same also assuming a straight line position parallel with the front portion of the bar 1 as shown in dotted lines in Fig. 2. The final operation is to bring the rear portions 5—5 of the bar 1 into the same straight line, at the same time forcing their ends together into substantially abutting engagement. In order to do this it is necessary to apply pressure at the ends of the bumper, the force being exerted lengthwise of the structure as though in an effort to shorten the bumper. The application of pressure in the direction indicated brings about two results. In the first place, the rear end portions 5—5 are thrown forwardly into line with each other and at the same time brought into contact at their ends, this distortion being accompanied by a slight contraction of the loops of the ends of the bar, and further by a slight bowing outwardly of the forward portion or impact member, as clearly shown in Fig. 3.

While the bars are thus under tension due to the pressure exerted thereon, the clamping or connecting member 2 is applied, the same being of any suitable design although preferably consisting of a pair of plates 6—6 applied flatwise against the ends of the bar and extending on either side of the joint and firmly secured by means of bolts 7—7 passing through holes formed near the ends of the bars and so located that in making the connection the ends of the bar will be brought into close contact. Once the free ends of the bar 1 are connected together, the pressure may be removed from the bumper and it will retain the shape shown in Fig. 3.

While it is impossible to illustrate the effect of the distortion of the bars, it is manifest that the bumper must necessarily be under a constant state of tension, due to the curved or bowed contour of the front impact member, which tends to resume its initial straight line formation. In other words, the bumper is maintained under a constant state of distortion which has the effect of giving it increased stiffness or rigidity with an attending capacity to resist greater impact than it would if it were not under tension. In this way the bumper is rendered more effective as a protection against collision damage, as well as more rigid against vibration.

Among the important results achieved by this treatment of the bumper, is to effect a decrease in the overhanging weight, that is, the weight of the material supported beyond the points at which the bumper is attached to the vehicle. Excessive overhanging weight is undesirable since it produces undue vibration and strain on the vehicle frame, and hence it is important in bumper designs to secure the maximum shock resisting capacity with the least overhanging weight. Thus by the treatment herein disclosed the increased rigidity of the bumper resulting from the introduction of added stiffness in the impact member, makes it possible to construct a bumper of a lighter material or stock, which has the same impact resisting qualities as a bumper of greater weight but without being treated to afford increased rigidity throughout the impact member.

Having set forth the advantages of the method of treating the bumper in accordance with the invention, I claim:

1. An automobile bumper comprising a continuous bar initially shaped to form a straight portion, looped portions at the ends of said straight portion, and rearwardly disposed end portions beyond said looped portions extending at a predetermined angle of divergence from said straight portion, said bar being adapted to be distorted by bringing the ends of said bar into fixed connection with each other to form a flattened loop, having all parts thereof under tension.

2. An automobile bumper comprising a continuous resilient bar initially formed to provide a straight forward portion, U-shaped end portions and rear end portions approaching each other at a predetermined angle of divergence whereby the distortion of the bar in bringing said rear portions into a straight line for joining, forms a flattened loop having all portions thereof under a uniform tension, and introduces an outwardly bowed contour into the front portion.

3. An automobile bumper comprising a continuous resilient bar initially formed to provide a straight forward portion, U-shaped end portions and rear end portions approaching each other at a predetermined angle of divergence whereby the distortion of the bar in bringing said rear portions into a straight line for joining, introduces an outwardly bowed contour into the front portion.

4. An automobile bumper comprising a continuous resilient bar initially formed to provide a straight front portion, U-shaped loops and rearwardly disposed free end positions extending inwardly from said U-shaped loops, said free end portions normally diverging rearwardly at a predetermined angle to the front portion and separated at their ends and adapted to be brought together into straight line positions and joined, thereby introducing a bowed contour in the front portion.

5. A method of treating a bumper comprising a continuous bar in the form of a flattened loop with connected ends consisting of initially shaping said bar to provide a straight front portion and inward and rearward end portions approaching each other along lines oblique to a straight line parallel with said front portion, and applying pressure necessary to bring the ends of the bar into proximity for joining thereby introducing curvature into said front portion.

6. A method of treating bumpers comprising a continuous bar in the form of a flattened loop consisting of initially shaping the bar to provide a straight forward portion, U-shaped ends and rearwardly disposed free end portions approaching each other along rearwardly diverging lines, and applying pressure necessary to bring the ends of the bar together and into a straight line for joining whereby an outward curvature is introduced into the front portion for the purpose described.

Signed at Chicago, Ill., this 11 day of August, 1924.

WILLIAM J. GROTENHUIS.